Patented June 28, 1932

1,864,746

UNITED STATES PATENT OFFICE

DAVID A. LEGG AND LEO M. CHRISTENSEN, OF TERRE HAUTE, INDIANA, ASSIGNORS TO COMMERCIAL SOLVENTS CORPORATION, OF TERRE HAUTE, INDIANA, A CORPORATION OF MARYLAND

PROCESS FOR THE PRODUCTION OF ORGANIC ACIDS FROM CELLULOSIC MATERIAL

No Drawing. Application filed February 19, 1930, Serial No. 429,818, and in Canada October 22, 1929.

Our invention relates to a method of fermenting cellulosic materials for the production of acetic and butyric acids and other useful products. More particularly, our invention relates to a method of fermenting cellulosic materials by the aid of nutrients such as "steep water".

In United States Patents Nos. 1,443,881; 1,602,306, and 1,639,571, Herbert Langwell has described methods of fermenting cellulosic materials by the aid of thermophilic bacteria which produce acetic acid, butyric acids, ethyl alcohol, and gases such as carbon dioxide, methane, and hydrogen. It has been the custom to prepare a comminuted mash from some form of cellulosic material such as, for example, corncobs. This mash is then inoculated with a mixture of organisms found in almost any form of fermenting vegetable matter, stable manure, pond mud, septic sewage, tank mud, soil, etc. These organisms are usually found in the intestinal tracts of cellulose-consuming animals, and accordingly a convenient form of inoculum is obtained by selecting material from the center of a steaming stable-manure heap. The fermentation is carried out at temperatures in the neighborhood of 60° C.

It has been found that, in general, organisms which produce acids during the course of a fermentation become less and less active as the concentration of acid in the medium increases. After a certain point is reached, the action of the bacteria becomes negligible unless the acid is removed from the medium. Such a condition is met with in the present case. It has been found advisable to maintain the hydrogen ion concentration of the fermenting media within the limits of about $10^{-9}$ and $10^{-5}$ measured in the bulk of the mash by the employment (a) of oxides, hydroxides, carbonates or bicarbonates of alkali metals including ammonium, or (b) oxides, hydroxides, carbonates or bicarbonates of alkaline earth metals including magnesium, in which cases compounds of alkali metals, which cause the formation of insoluble alkaline earth metal compounds, are added from time to time. It is preferred to follow the procedure outlined under (a); in which case, it is necessary to make small additions of the neutralizing agent at intervals thruout the fermentation. Whatever method is resorted to, the mash should be agitated at frequent intervals or at least after each addition of neutralizing agent.

Like all protoplasmic bodies, bacteria consist of carbon, oxygen, hydrogen, and nitrogen, together with inorganic salts and varying quantities of phosphorus and sulfur. In order that bacteria may develop and multiply, therefore, they must be supplied with these substances in proper quantities and in forms suitable for assimilation. The first three materials named are present in the cellulose used as the raw material. Certain of the other required materials are usually present in small but insufficient quantities with the raw material used as the source of the cellulose material. In the past, it has been the custom to supply the nutrients necessary for the thermophilic fermentation of cellulosic materials in the form of suitable amounts of mineral substances. Such materials as potassium sulphate, sodium phosphate, ammonium chloride, ammonium sulphate, potassium chloride, etc. in varying proportions have been used for this purpose.

We have now found that these necessary nutrient-materials may be satisfactorily supplied in the form of certain waste products, for example, "steep water". In the manufacture of various corn products such as starch, oil, gluten, and oil cake, it has for years been the practice to disintegrate the maize kernels by digesting them with weak sulfurous acid or other acid solutions, whereby the various portions of the kernel are loosened and may be easily separated.

During this steeping process some of the protein is decomposed, partly by the acid present and partly by the enzymes or bacteria present in the corn. As a result of this hydrolysis the solution retains certain water-soluble nitrogenous bodies derived from corn protein. This sulfurous acid solution, after concentration to a specific gravity corresponding to 22–30° Baumé scale, is known as "concentrated steep water", and has the following approximate composition:

| | |
|---|---|
| Water | 55 –65% |
| Soluble nitrogenous material | 22 –17 |
| Ash | 10 – 7 |
| Non-nitrogenous extract | 10 |
| Acid | 3 – 4 |
| Sulphur dioxide | 0.1– 0.2 |

The ash contains 30–40% $P_2O_5$.

While the steep water usually available is generally obtained as above described, products of similar character may be obtained in other ways. For example, other cereals may also be subjected to steeping with weak sulphurous acid or other acid solutions. Or, maize or other cereals may be subjected to steeping in water alone. In this application the term "steep water" is intended to include materials prepared by any of these general methods.

We have now found that steep water makes a very satisfactory substitute for the nutrients previously used in the fermentation of cellulosic materials by means of thermophilic bacteria, the nitrogen necessary for the metabolism of the bacteria being supplied by the soluble nitrogenous matter contained in the steep water and the other materials being found in the ash part. The use of steep water as a nutrient obviates the necessity of adding varying amounts of a number of relatively expensive different nutrient materials to the cellulosic material to be fermented, and at the same time gives equally efficient yields.

The following are cited as examples of methods of carrying out our improved process of fermenting cellulosic material by the aid of thermophilic bacteria. It is distinctly understood, however, that our invention is not limited to these specific examples but includes also such modification as will naturally occur to one skilled in the art.

Example

Dry but unsterilized maize cobs are pulverized by suitable means until the greater portion of the material passes a 30 mesh screen. A mash of approximately 7% concentration is made from this maize cob meal and water. To this is then added nutrient material in the form of steep water in amount preferably ranging from 0.5 to 10.0% or better of concentrated steep water. The temperature of the mash thus prepared is next raised to approximately 60°–65° C., and if preferred, allowed to be fermented spontaneously by the thermophilic bacteria naturally present on the maize cob meal. However, in order to maintain a uniform fermentation and a regular working schedule it is usually advisable to inoculate the mash with from 1 to 5% of horse or other animal manure which has become heated by auto-fermentation. Or, if desired, the method of inoculating may be otherwise suitably modified. As soon as active fermentation has set in, which may be in from 15 to 36 hours, the liquid is tested for hydrogen ion concentration, and if it is found to be greater than $10^{-6}$, a neutralizing agent such as, for example, sodium bicarbonate is added in such amount as will bring the hydrogen ion concentration of the medium down to about $10^{-7}$. The examination of the liquid and subsequent addition of neutralizing agent is repeated at necessary intervals until active fermentation has ceased. The resulting fermented liquor can then be worked up for the separation of the products contained therein by any of the ordinary methods. The following table shows typical results obtained by the use of steep water as a nutrient in the fermentation of cellulosic materials with thermophilic bacteria under the general conditions which have just been outlined.

*Table*

| Nutrient | Yield of total volatile acids in 7 days based on air dry maize cobs |
|---|---|
| No nutrient | 9.1% |
| 1.0% steep water | 15.8 |
| 2.0% steep water | 17.3 |
| 4.0% steep water | 20.5 |
| 6.0% steep water | 28.4 |
| 8.0% steep water | 21.0 |

In certain co-pending applications (U. S. Serial Nos. 150,139 and 150,140 by Herbert Langwell, et al.) the use of various forms of distillery wastes, as for example, yeast water, distillation slops obtained in the butyl-acetonic fermentation process, etc., as nutrients in the fermentation of cellulosic materials has been disclosed. We have now found that if a small amount of steep water is used with these distillery waste nutrients, still better results may be obtained. When such materials are available, distillery waste such as, for example, butyl-acetonic slops may be substituted for a part or all of the water used in making up the mash from the cellulosic material to be fermented. To this may then be added the desired amount of steep water and the operation carried out just as described above. Amounts up to 5–10% of the total mash may be used but as a rule little additional advantage is gained by using more than 3–4%. The table given below shows results obtained from a mash made up with 5% by weight of maize cob meal in butyl-acetonic slop instead of water. To separate portions of this mash, were added varying proportions of steep water and the mash subjected to fermentation as previously described. At the end of seven, and again after twelve days time the amount of total volatile acids in each sample was determined.

Table

| Medium | Additional nutrient in form of steep water | Yield of total volatile acids based on air dry maize cobs | |
|---|---|---|---|
| | | 7 days | 12 day |
| 5% maize cob meal in butyl-acetonic slop | None. | 25.8% | 37.5% |
| 5% maize cob meal in butyl-acetonic slop | 0.1% | 27.2 | 40.0 |
| 5% maize cob meal in butyl-acetonic slop | 0.2 | 26.3 | 40.2 |
| 5% maize cob meal in butyl-acetonic slop | 0.5 | 27.2 | 40.9 |
| 5% maize cob meal in butyl-acetonic slop | 1.0 | 30.4 | 42.5 |
| 5% maize cob meal in butyl-acetonic slop | 2.0 | 33.1 | 51.0 |

The fermentation may be carried out under either aerobic or anaerobic conditions. The fermentation vessels may be constructed of wood, and the necessary connections, stirrers and heating coils should be constructed of lead or, better still, aluminium.

The proper regulation of the acidity of the fermenting mash is of the greatest importance. If optimum results are to be obtained it is imperative that frequent additions of alkalies be made but care should be taken so as not to reduce the acidity too low; the best results being obtained if the hydrogen ion concentration is maintained within the limits of about $10^{-9}$ and $10^{-5}$. In place of sodium bicarbonate cited in the example above, other compounds of alkali metals (including ammonium) such as, for example, sodium carbonate, soda ash, ammonium hydroxide, ammonium carbonate, etc., may be used. Alkaline compounds of alkaline earth metals (including magnesium) may also be employed for this purpose but they are somewhat less suitable.

The time of fermentation may vary over wide limits, depending upon a number of factors. Fermentations of this type have been carried out over periods of time ranging from 2 to 21 days. For mashes containing 5 to 7% of cellulose, 7 days may be regarded as about the average.

In carrying out our new and improved process of cellulosic fermentation we prefer to employ as the fermentation agent, organisms of the type described by Langwell in U. S. Patents 1,443,881, 1,602,306 and 1,639,571. It is distinctly understood, however, that we do not limit ourselves solely to the use of such organisms, but may employ also other thermophilic organisms which ferment cellulosic materials. It is also understood that we may, if desired, substitute steep water for only a portion of the nutrients ordinarily employed. It is also understood that altho we have only described, in the example cited above, the use of 1.0 to 8.0% of steep water as nutrients for this type of fermentation, a larger proportion may sometimes be used with good results.

Now having described our invention, what we claim as new and novel is:

1. A process for the production of fatty acids which comprises subjecting a mash containing cellulosic materials to the action of bacteria capable of fermenting cellulose, controlling the acidity of the mash so that the hydrogen ion concentration is maintained preferably within the limits $10^{-9}$ and $10^{-5}$ measured in the bulk of the mash, and effecting the necessary supply of nutrient for the cellulose fermenting bacteria at least in part by steep water.

2. A process for the production of fatty acids which comprises subjecting a mash containing cellulosic materials to the action of bacteria capable of fermenting cellulose, controlling the acidity of the mash so that the hydrogen ion concentration is maintained preferably within the limits $10^{-9}$ and $10^{-5}$ measured in the bulk of the mash, and effecting the necessary supply of nutrient for the cellulose fermenting bacteria at least in part by a mixture comprising steep water and distillery waste.

3. A process for the production of fatty acids which comprises subjecting a mash containing cellulosic materials to the action of bacteria capable of fermenting cellulose, controlling the acidity of the mash by the employment of compounds selected from the group consisting of alkaline compounds of alkali metals and ammonium so that the hydrogen ion concentraton is maintained preferably within the limits $10^{-9}$ and $10^{-5}$ measured in the bulk of the mash, and effecting the necessary supply of nutrient for the cellulose fermenting bacteria at least in part by steep water.

4. A process for the production of fatty acids which comprises subjecting a mash containing cellulosic materials to the action of bacteria capable of fermenting cellulose, controlling the acidity of the mash by the employment of compounds selected from the group consisting of alkaline compounds of alkali metals and ammonium so that the hydrogen ion concentration is maintained preferably within the limits $10^{-9}$ and $10^{-5}$ measured in the bulk of the mash, and effecting the necessary supply of nutrient for the cellulose fermenting bacteria at least in part by a mixture comprising steep water and distillery waste.

5. A process for the production of fatty acids which comprises subjecting a mash containing cellulosic materials to the action of bacteria capable of fermenting cellulose controlling the acidity of the mash so that the hydrogen ion concentration is maintained preferably within the limits $10^{-9}$ and $10^{-5}$ measured in the bulk of the mash, and effecting the necessary supply of nutrient for the bacteria at least in part by the addition of 0.5 to 10.0% of concentrated steep water.

6. A process for the production of fatty acids which comprises subjecting a mash containing cellulosic materials to the action of bacteria capable of fermenting cellulose, controlling the acidity of the mash so that the hydrogen ion concentration is maintained preferably within the limits $10^{-9}$ and $10^{-5}$ measured in the bulk of the mash, and effecting the necessary supply of nutrient for the bacteria at least in part by the addition of 0.1 to 4.0% of concentrated steep water to a mash made up with butylacetonic slop.

7. In a process for the production of fatty acids and other useful products by the fermentation of a mash containing cellulosic materials, the step which comprises effecting the necessary supply of nutrient material for the bacteria at least in part by steep water.

8. In a process for the production of fatty acids and other useful products by the fermentation of a mash containing cellulosic materials, the step which comprises effecting the necessary supply of nutrient material for the bacteria at least in part by a mixture comprising steep water and distillery waste.

9. In a process for the production of fatty acids and other useful products by the fermentation of a mash containing cellulosic material, the step which comprises effecting the necessary supply of nutrient material for the bacteria at least in part by the addition of 0.5 to 10.0% of concentrated steep water.

10. In a process for the production of fatty acids and other useful products by the fermentation of mash containing cellulosic material, the step which comprises effecting the necessary supply of nutrient material for the bacteria at least in part by the addition of about 0.1 to 10% of concentrated steep water to a mash made up with butyl-acetonic slop.

In testimony whereof we affix our signatures.

DAVID A. LEGG.
LEO M. CHRISTENSEN.